United States Patent
Losh et al.

(10) Patent No.: US 10,162,453 B2
(45) Date of Patent: Dec. 25, 2018

(54) SENSOR SIDE CHARGE CANCELLATION

(71) Applicant: Synaptics Incorporated, San Jose, CA (US)

(72) Inventors: Jonathan Losh, Sunnyvale, CA (US); Don Speck, San Jose, CA (US)

(73) Assignee: Synaptics Incorporated, San Jose, CA (US)

(*) Notice: Subject to any disclaimer, the term of this patent is extended or adjusted under 35 U.S.C. 154(b) by 170 days.

(21) Appl. No.: 14/883,387

(22) Filed: Oct. 14, 2015

(65) Prior Publication Data

US 2016/0110009 A1    Apr. 21, 2016

Related U.S. Application Data

(60) Provisional application No. 62/064,383, filed on Oct. 15, 2014.

(51) Int. Cl.
  *G06F 3/045* (2006.01)
  *G06F 3/041* (2006.01)
  *G06F 3/044* (2006.01)

(52) U.S. Cl.
  CPC ............ *G06F 3/0416* (2013.01); *G06F 3/044* (2013.01)

(58) Field of Classification Search
  CPC ................................ G06F 3/0416; G06F 3/044

USPC .......................................................... 345/174
  See application file for complete search history.

(56) References Cited

U.S. PATENT DOCUMENTS

| | | | |
|---|---|---|---|
| 8,049,732 B2 | 11/2011 | Hotelling et al. | |
| 8,350,823 B2 | 1/2013 | Hasegawa et al. | |
| 8,553,004 B2 | 10/2013 | Hotelling et al. | |
| 8,599,167 B2 | 12/2013 | Joharapurkar et al. | |
| 2002/0011991 A1 | 1/2002 | Iwasaki et al. | |
| 2010/0110040 A1* | 5/2010 | Kim | G06F 3/0412 345/174 |
| 2011/0273399 A1 | 11/2011 | Lee | |
| 2012/0218222 A1 | 8/2012 | Shen et al. | |
| 2012/0287077 A1* | 11/2012 | Pant | G06F 3/044 345/174 |
| 2015/0145802 A1* | 5/2015 | Yao | G06F 3/0416 345/174 |

\* cited by examiner

*Primary Examiner* — Insa Sadio
(74) *Attorney, Agent, or Firm* — Ferguson Braswell Fraser Kubasta PC (57) ABSTRACT

An input device includes a receiver electrode, a transmitter electrode and a processing system coupled to the receiver electrode and transmitter electrode. The processing system is configured to transmit a transmitter signal with the transmitter electrode during a first time period, inject a charge onto the receiver electrode during a second time period, and receive a resulting signal from the receiver electrode during a third time period. The resulting signal includes effects corresponding to the injected charge. The second time period and the third time period are non-overlapping.

17 Claims, 9 Drawing Sheets

SENSOR SIDE CHARGE CANCELLATION

CROSS REFERENCE TO RELATED APPLICATIONS

This application claims priority under 35 U.S.C. § 119(e) to U.S. Provisional Patent Application Ser. No. 62/064,383, filed on Oct. 15, 2014, and entitled, "Sensor Side Charge Injection", which is incorporated herein by reference in its entirety.

FIELD OF THE INVENTION

This invention generally relates to electronic devices.

BACKGROUND

Input devices including capacitive sensor devices (also commonly called touchpads or touch sensor devices) are widely used in a variety of electronic systems. A capacitive sensor device typically includes a sensing region, often demarked by a surface, in which the capacitive sensor device determines the presence, location and/or motion of one or more input objects. Capacitive sensor devices may be used to provide interfaces for an electronic system. For example, capacitive sensor devices are often used as input devices for larger computing systems (such as opaque touchpads integrated in, or peripheral to, notebook or desktop computers). Capacitive sensor devices are also often used in smaller computing systems (such as touch screens integrated in cellular phones).

SUMMARY

In general, the invention relates to a capacitive sensor device that includes at least one receiver electrode, at least one transmitter electrode, and a processing system coupled to the at least one receiver electrode and the at least one transmitter electrode. The processing system is configured to transmit a transmitter signal with the at least one transmitter electrode during a first time period, inject a charge onto the at least one receiver electrode during a second time period, and receive a resulting signal with the at least one receiver electrode during a third time period. The resulting signal includes effects corresponding to the injected charge and the transmitter signal. The second time period and the third time period are non-overlapping.

In general, in one aspect, the invention relates to a processing system that includes a transmitter module, a compensation circuit, and a receiver module. The transmitter module is coupled to a transmitter electrode and configured to transmit a transmitter signal with the transmitter electrode during a first time period. The compensation circuit is coupled to a receiver electrode and is configured to inject a charge onto the receiver electrode during a second time period. The receiver module is coupled to the receiver electrode and configured receive a resulting signal from the receiver electrode during a third time period. The resulting signal includes effects corresponding to the injected charge and the transmitter signal. The second time period and the third time period are non-overlapping.

In general, in one aspect, embodiments relate to a method that includes transmitting a transmitter signal on a transmitter electrode during a first time period, injecting a charge onto a receiver electrode during a second time period, and receiving a resulting signal with the receiver electrode during a third time period. The resulting signal includes effects corresponding to the injected charge and the transmitter signal. The second time period and the third time period are non-overlapping. The method further includes determining positional information for one or more input objects based on the resulting signals.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements.

FIG. 1.1 shows an example block diagram in accordance with one or more embodiments of the invention.

FIG. 1.2 shows a block diagram of an example system that includes an input device in accordance with an embodiment of the invention.

FIGS. 8.1 and 8.2 show example results in accordance with one or more embodiments of the invention.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, one or more embodiments of the invention are directed to cancelling charge on a sensor electrode(s). For example, one or more embodiments of the invention may be used to minimize or remove shadowing effects on sensors. In particular, a shadowing effect is the result of an input object affecting a sensor that has a large RC time constant. The RC time constant, also called tau, is the time constant of an RC circuit, and is equal to the product of the circuit resistance and the circuit capacitance. The RC time constant of the sensor is a measure of how quickly the sensor responds to signals. If signals, such as electrical sensing stimuli, are coming in faster than the sensor response can settle to a steady state value, then the response will be dependent on the RC time constant. When an input object is proximate to the sensing region, the shadowing effect is the effect that the measurements of the change in capacitance of the sensing region reflect not only a change in capacitance at the position in which the input object is located, but also at other positions as well due to the increase in the overall RC time constant of the sensor caused by the added capacitance of the input object. For example, in some capacitance sensing embodiments, the shadow may be along the same trace or line of the receiver electrode as the input object. The change in measurement may be mistaken for the same or an additional input object, which may cause an incorrect reporting of input objects or their size and/or position in the sensing region.

One or more embodiments of the invention inject (drive) a compensating charge onto the receiver electrode and, then, at a non-overlapping time, receive a resulting signal. In various embodiments, the injected charge polarity is selected so the injected charge cancels at least a portion of the charge on the receiver electrode due to the transmitter signal driven on the transmitter electrode. Depending on the transmitter polarity, in some embodiments, injecting a charge subtracts charge from the receiver electrode; in other embodiments, injecting a charge adds charge to the receiver electrode. The compensation charge may be injected a little before, after, or at substantially the same time as the transmitter signal. By injecting both a charge and a transmitter signal onto the receiver electrode at a non-overlapping time before the resulting signal is received, the net amount of charge of the receiver electrode that is subject to the RC time product is reduced and, thus, the effects of the RC time product may be reduced. Thus, the shadowing effect may be reduced, minimized, and/or eliminated in accordance with one or more embodiments of the invention.

Figure 11:
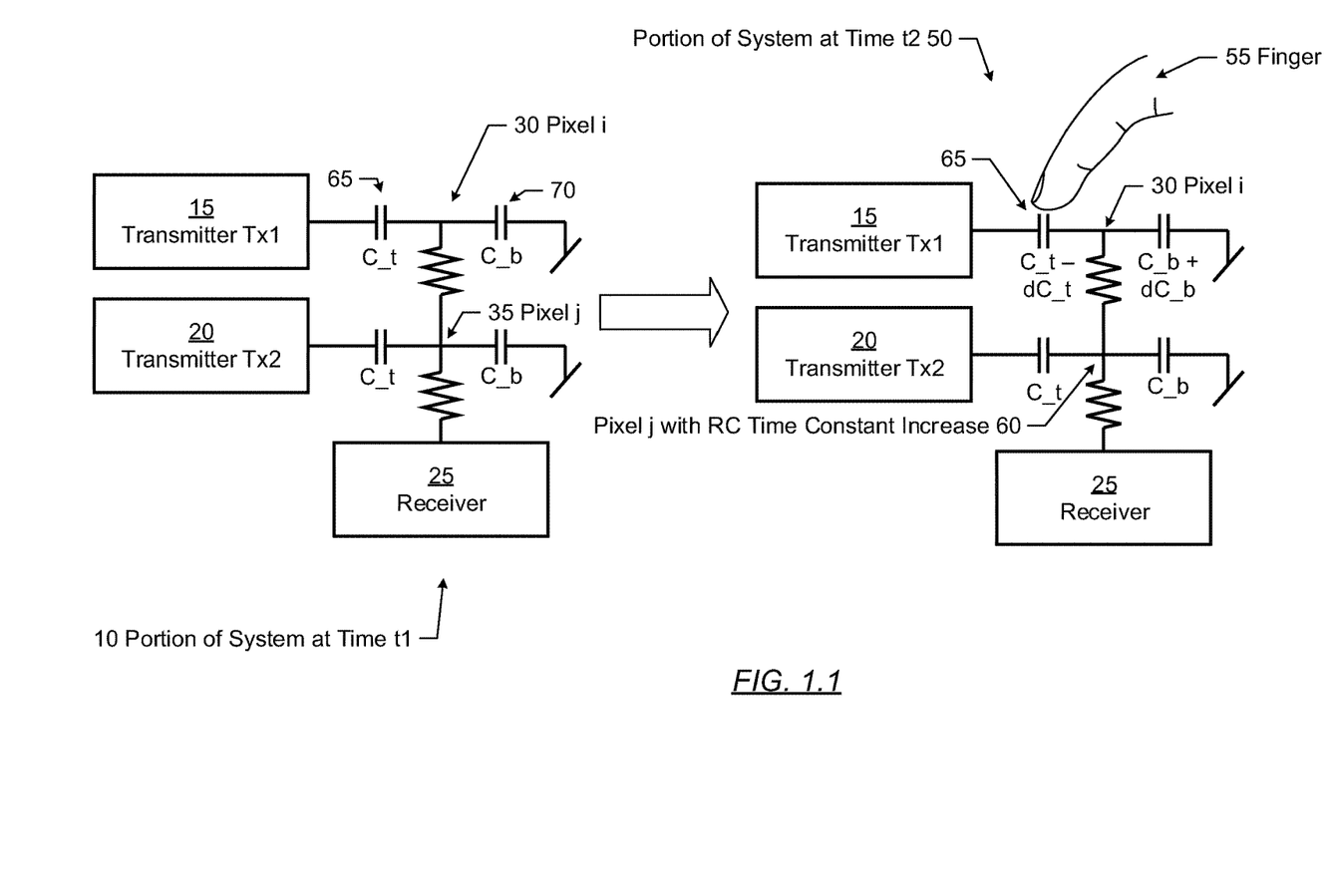

Turning now to the figures, FIG. 1.1 shows an example of the shadowing effect by showing a portion of the system at time t1 (10) and a portion of the system at time t2 (50) in accordance with one or more embodiments of the invention. As shown in FIG. 1.1, the portion of the system shows transmitter TX1 (15), transmitter TX2 (20), and receiver (25). The lines represent paths between the transmitters and receiver, where the path may include one more capacitances and resistances. Further, $C\_t$ represents the trans capacitance between a transmitter and a receiver. $C\_b$ is background capacitance, which is the capacitance of the trace to various objects around the trace that are not electrically connected to the system, and also to free space. Additionally, $dC\_t$ is the change in trans capacitance when an object is touching the sensing region, and $dC\_b$ is the change in background capacitance when an object is touching the sensing region. The connection of transmitter TX1 (15) to receiver (25) is pixel i (30), and the connection of transmitter TX2 (20) to receiver (25) is pixel j (35).

As shown in the portion of the system at time t1 (10), the value of capacitance (65) is $C\_t$ and the value of capacitance (70) is $C\_b$. As shown in the portion of the system at time t2 (50), when finger (55) touches capacitance (65), the value of capacitance (65) changes to $C\_t-dC\_t$ and the value of capacitance (70) changes to $C\_b+dC\_b$. The finger (55) touches the capacitance (65) connecting transmitter TX1 (15) to receiver (25), thereby resulting in the system detecting the finger (55) at pixel i (30). However, because of the shadowing effect, pixel j has an RC time constant increase (60). Thus, an additional finger may be falsely detected, or may fail to be detected at pixel j (60) in the absence of the effects of one or more embodiments of the invention.

Figure 12:
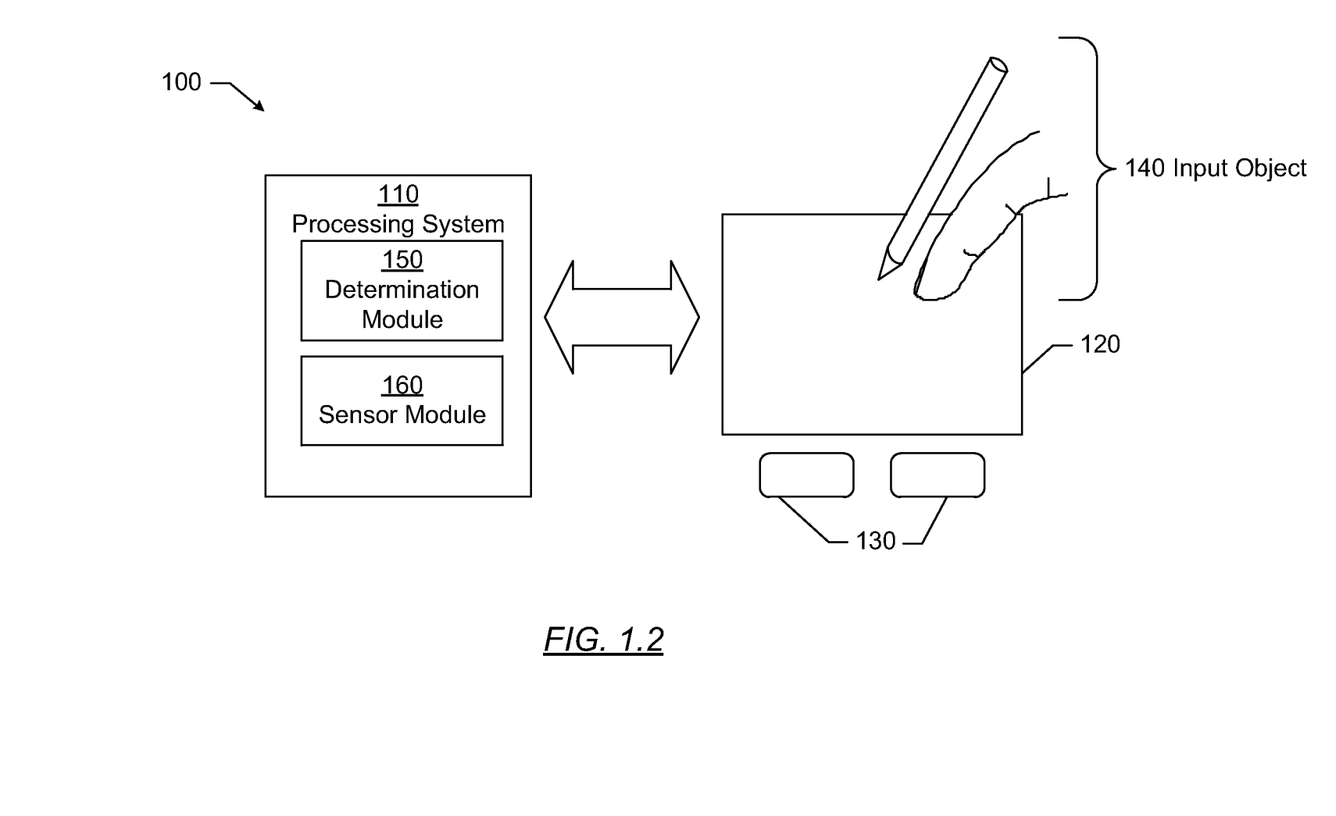

FIG. 1.2 is a block diagram of an exemplary input device (100), in accordance with one or more embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include computers of all sizes and shapes, such as desktop computers, laptop computers, netbook computers, tablets, web browsers, e-book readers, and personal digital assistants (PDAs). Additional example electronic systems include composite input devices, such as physical keyboards that include an input device (100) and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

In FIG. 1.2, the input device (100) is shown as a capacitive sensor device (also often referred to as a "touchpad", "touch screen" or a "touch sensor device") configured to sense input provided by one or more input objects (140) in a sensing region (120). Example input objects (140) include fingers and styli, as shown in FIG. 1.2. Sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that includes no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

Throughout the Specification, the singular form of input object may be used. Although the singular form is used, multiple input objects (140) may exist in the sensing region (120). Further, the particular input objects (140) that are present in the sensing region may change over the course of the gestures. For example, a first input object may be in the sensing region to perform a first gesture, subsequently, the first input object and a second input object may be in the above surface sensing region, and, finally, a third input object may perform a second gesture. To avoid unnecessarily complicating the description, the singular form of input object is used and refers to all of the above variations.

The input device (100) may utilize any combination of sensor components and sensing technologies to detect user input in the sensing region (120). The input device (100) includes one or more sensing elements for detecting user input.

In some capacitive implementations of the input device (100), voltage or charge is applied to create an electrostatic field. Nearby input objects cause changes in the electric field, and produce detectable changes in capacitive coupling that may be detected as changes in voltage, current, charge or the like.

In various embodiments, to reduce wiring, especially in large sensors, some capacitive implementations utilize arrays or other regular or irregular patterns of capacitive sensing elements. In some capacitive implementations, separate sensing elements may be ohmically shorted together to form extended sensor electrodes, such as rows and columns. Sensor elements may cross over other sensor elements. The cross-over regions may be narrow, and may be made of a material with substantial electrical resistivity, such as the substantially transparent materials utilized in touch screens. Some capacitive implementations utilize resistive sheets, for example as shields or other sensor electrodes, which may be uniformly resistive. Therefore, capacitive sensors may have substantial series resistance and thus a substantial RC time constant.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a trans capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) or the receiver electrode voltage to transmit transmitter signals. Receiver sensor electrodes may be held substantially constant relative to the reference voltage to facilitate receipt of resulting signals. A resulting signal may include effect(s) corresponding to one or more transmitter signals, and/or to one or more sources of environmental interference (e.g. other electromagnetic signals). Sensor electrodes may be dedicated transmitters or receivers, or may be configurable to either transmit or receive. Measurements acquired using mutual capacitance sensing methods may be referred to as mutual capacitance measurements.

Regardless of the sensing method that is used, driving the sensor electrodes with a time-varying voltage signal may be referred to as modulating the sensor electrode or exciting a sensor electrode. Conversely, the remaining sensor electrodes may be connected to a ground (e.g., system ground or any other ground) or other reference voltage. Connecting the sensor electrodes to a ground or holding electrodes substantially constant may be referred to as connecting the sensor electrodes to a voltage signal that is substantially constant relative to the receiver electrodes. In other words, a constant voltage signal includes a substantially constant voltage signal without departing from the scope of the invention. Further, the sensor electrodes may be of varying shapes and/or sizes. The same shapes and/or sizes of sensor electrodes may or may not be in the same groups. For example, in some embodiments, receiver electrodes may be of the same shapes and/or sizes while in other embodiments receiver electrodes may be varying shapes and/or sizes.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1.2, the processing system (110) may include a determination module (150) and a sensor module (160). The determination module (150) may include functionality to determine when at least one input object is in sensing region (120), determine signal to noise ratio, determine positional information of an input object, identify a gesture, determine an action to perform based on the gesture, a combination of gestures or other information, perform power-management operations such as determining when to wake up and when to go to sleep and perform other operations.

The sensor module (160) may include functionality to drive the sensor electrodes to transmit transmitter signals and receive resulting signals. For example, the sensor module (160) may include sensory circuitry that is coupled to the sensor electrodes. The sensor module (160) may include, for example, a transmitter module and a receiver module. The transmitter module may include transmitter circuitry that is coupled to at least one transmitter electrode. The receiver module may include receiver circuitry coupled to at least one receiver electrode and may include functionality to receive the resulting signals.

Although FIG. 1.2 shows only a determination module (150) and a sensor module (160), alternative or additional modules may exist in accordance with one or more embodiments of the invention. Such alternative or additional modules may correspond to modules or sub-modules that are distinct from one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures such as mode changing gestures, and mode changing modules for changing operation modes.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, zoom, pan, scroll, rotate and other functions. In some embodiments, the processing system (110) provides information about the input (or lack of input) to some part of the electronic system (e.g. to a central processing system of the electronic system that may be separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as gestures or commands, recognize handwriting, and the like.

"Positional information" as used herein broadly encompasses absolute position, relative position, velocity, acceleration, and other types of spatial information. Exemplary "zero-dimensional" positional information includes near/far, contact/no contact information or zero-dimensional gestures (e.g., taps and double taps). Exemplary "one-dimensional" positional information includes positions along an axis (e.g., scrolling and swipe gestures). Exemplary "two-dimensional" positional information includes motions in or above a plane. Exemplary "three-dimensional" positional information includes instantaneous or average velocities in space. Further examples include other representations of spatial information. Trend data regarding one or more types of positional information may also be determined and/or stored, including, for example, trend data that tracks position, motion, or instantaneous velocity over time. The trend data may be used in calculations for de-jitter, to compute relative position, and/or ballistics. In some embodiments, velocity may be used in gesture processing. Further, in some embodiments, the trend data may be referred to as state information.

In some embodiments, the input device (100) is implemented with additional input components that are operated by the processing system (110) or by some other processing system. These additional input components may provide redundant functionality for input in the sensing region (120), or some other functionality. FIG. 1.2 shows buttons (130) near the sensing region (120) that may be used to facilitate selection of items using the input device (100). Other types of additional input components include sliders, balls, wheels, switches, force sensors and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying or part of the display screen and provide a touch screen interface for the associated electronic system. The substantially transparent sensor electrodes may be composed, at least in part, of a substantially transparent material, narrow or thin strips of opaque material, and/or a perforated material. The display screen may be any type of dynamic display capable of displaying a visual interface to a user, and may include any type of light emitting diode (LED), organic LED (OLED), liquid crystal display (LCD), electrophoretic ink (e ink), electroluminescence (EL), or other display technology. The input device (100) and the display screen may share physical elements. For example, some embodiments may utilize some of the same electrical components for displaying and sensing. As another example, the display screen may be operated in part or in total by the processing system (110).

In FIG. 1.2, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. In some embodiments, the processing system (110) also includes electronically-readable instructions, such as firmware code, software code, microcode and/or the like. In some embodiments, components comprising the processing system (110) are located together, such as near sensing element(s) of the input device (100). In other embodiments, components of processing system (110) are physically separate with one or more components close to sensing element(s) of input device (100), and one or more components elsewhere. For example, the input device (100) may be a peripheral coupled to a desktop computer, and the processing system (110) may include software configured to run on a central processing unit of the desktop computer and one or more ICs (perhaps with associated firmware) separate from the central processing unit. As another example, the input device (100) may be physically integrated in a phone, and the processing system (110) may include circuits and firmware that are part of a main processor of the phone. In some embodiments, the processing system (110) is dedicated to implementing the input device (100). In other embodiments, the processing system (110) also performs other functions, such as operating display screens, driving haptic actuators, etc. In yet other embodiments, the processing system (110) may be divided between more than one integrated circuit. For example, the first module of processing system (110) may be included within a first integrated circuit and the second module of processing system (110) may be included within a second integrated circuit. In another example, the processing system includes multiple integrated circuits communicatively coupled together to drive input devices having large sensor regions. In one embodiment, the transmitter module may be included within a first integrated circuit and the receiver module may be included within a second integrated circuit. In yet other embodiments, one or more of the integrated circuits may comprise additional modules configured to operate a display or other device.

It should be understood that while many embodiments of the invention are described in the context of a fully functioning apparatus, the method corresponding to the present invention is capable of being distributed as a program product (e.g., software) in a variety of forms. For example, some or all of the mechanisms of the present invention may be implemented and distributed as a software program on information bearing media that are readable by electronic processors (e.g., non-transitory computer-readable and/or recordable/writable information bearing media readable or downloadable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, non-volatile memory, memory sticks, memory cards, memory modules, and or any other computer readable storage medium. Electronically readable media may be based on flash, read-only memory (ROM), optical, magnetic, holographic, or any other storage technology.

Although not shown in FIG. 1.2, the processing system, the input device, and/or the host system may include one or more computer processor(s), associated memory (e.g., random access memory (RAM), cache memory, flash memory, read-only memory (ROM), etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more central processing unit cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

The input device (100) may be implemented as a physical part of the electronic system, or may be physically separate from the electronic system. Further, portions of the input device (100) may be implemented as part of the electronic system. For example, all or part of any module may be implemented in the software, firmware, device driver, and/or display, or display driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, IRDA, opto-isolators, level shifters, and video data links.

Figure 2:
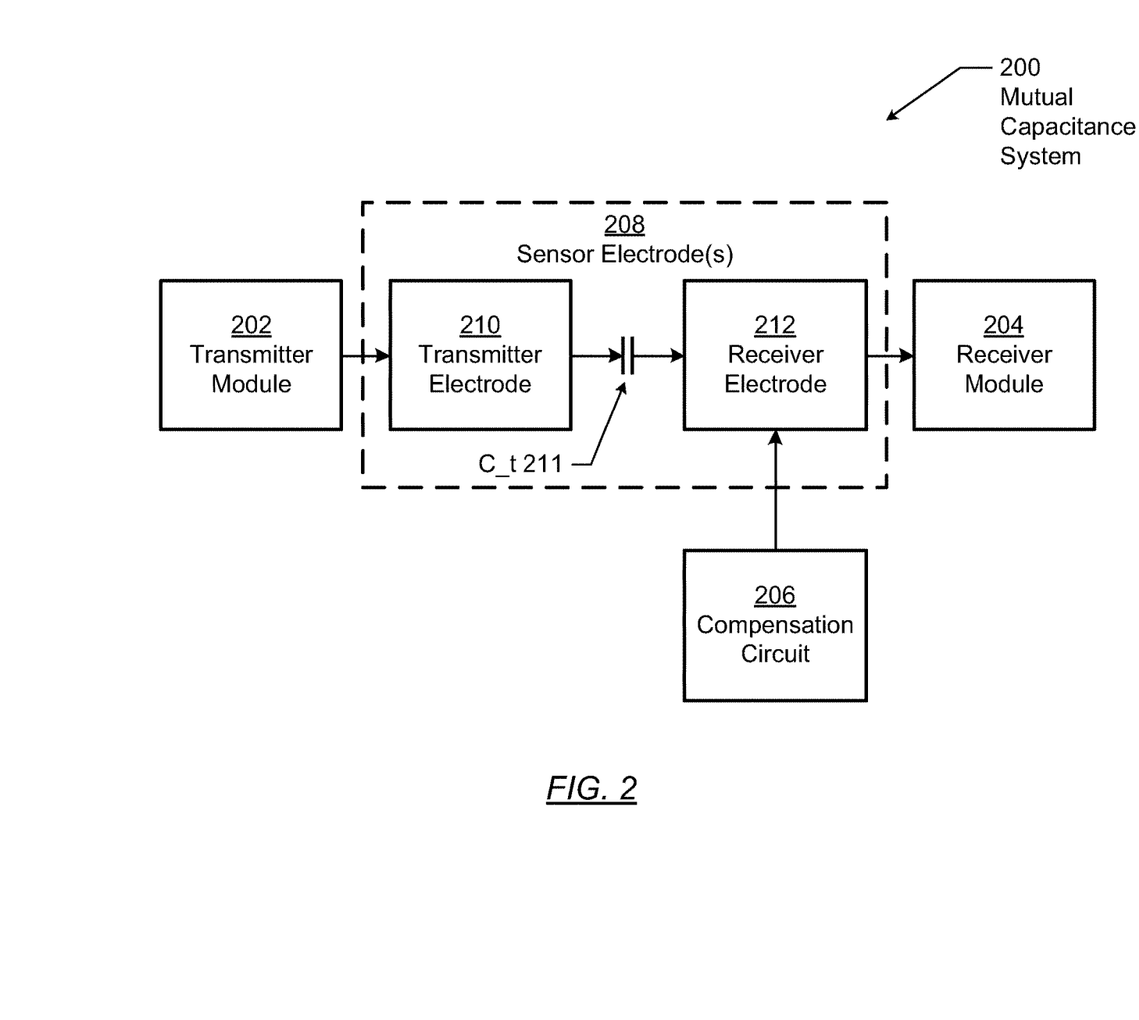
FIGS. 2-6 show block diagrams of example systems in accordance with one or more embodiments of the invention.

FIG. 2 shows a schematic diagram of a mutual capacitance system (200) in accordance with one or more embodiments of the invention. As shown in FIG. 2, the mutual capacitance system (200) may include a transmitter module (202), a receiver module (204), one or more sensor electrodes (208) and capacitance C_t (211). The sensor electrode(s) (208) may include, for example, a transmitter electrode (210) and a receiver electrode (212).

The transmitter module (202) is used to transmit a transmitter signal onto the transmitter electrode (210), as discussed above with reference to FIG. 1.2. The receiver module (204) may include functionality to receive a resulting signal using the receiver electrode (212), as discussed above and in FIG. 1.2.

In one or more embodiments of the invention, the transmitter module (202) may be implemented as having at least one digital component, as having at least one hardware circuit component, or as any other type of component. The transmitter module (202) includes functionality to drive a transmitter signal onto the sensor electrode(s) (208) for capacitive sensing. In particular, the transmitter module (202) includes functionality to drive the transmitter electrode (210).

In one or more embodiments of the invention, the receiver module (204) may be implemented as having at least one digital component, as having at least one hardware circuit component, or as any other type of component. In one or more embodiments of the invention, the receiver module (204) includes functionality to receive resulting signals from the sensor electrode(s) (208). Specifically, the receiver module (204) includes functionality to receive the resulting signals using the receiver electrode (212) of the sensor electrode(s) (208).

Continuing with FIG. 2, a compensation circuit (206) includes functionality to inject a charge onto the receiver electrode(s) (212). In one or more embodiments of the invention, the charge driven by the compensation circuit (206) is a sensor electrode cancellation charge that reduces the effect of the RC time constant by reducing the amount of charge on the receiver electrode. In other words, the compensation circuit (206) reduces the net charge on the receiver electrode that is subject to the RC time constant, reducing the effects of RC time constant and the shadowing effects. In some embodiments, the compensation circuit is configured to subtract charge from the sensor electrode. Further, the charge is injected onto the receiver electrode at a non-overlapping time before when the resulting signals are received from the receiver electrode. In one or more embodiments of the invention, when the transmitter module (202) drives the charge, the charge injected onto the receiver electrode (212) substantially remains on the sensor electrode (212), rather than flowing to the receiver module (204). The prevention of the flow to the receiver module (204) may be based on a high impedance path or based on a switch.

In one or more embodiments, the connection between the receiver module (204) and the sensor electrodes(s) (208) is configured such that the compensation and receiving of resulting signals are performed at non-overlapping times. The receiver module (204) may be connected to the sensor electrode(s) (208) via a high impedance path or using a switch. The high impedance path may be a connection that allows a small amount of current through per unit of applied voltage. In some embodiments, a high impedance path is a connection that allows an injected charge to flow substantially onto the receiver electrode instead of flowing into the receiver so that compensation (or cancellation) can take place. A switched impedance that is high impedance at the non-overlapping times may be used in accordance with one or more embodiments of the invention.

Figure 3:
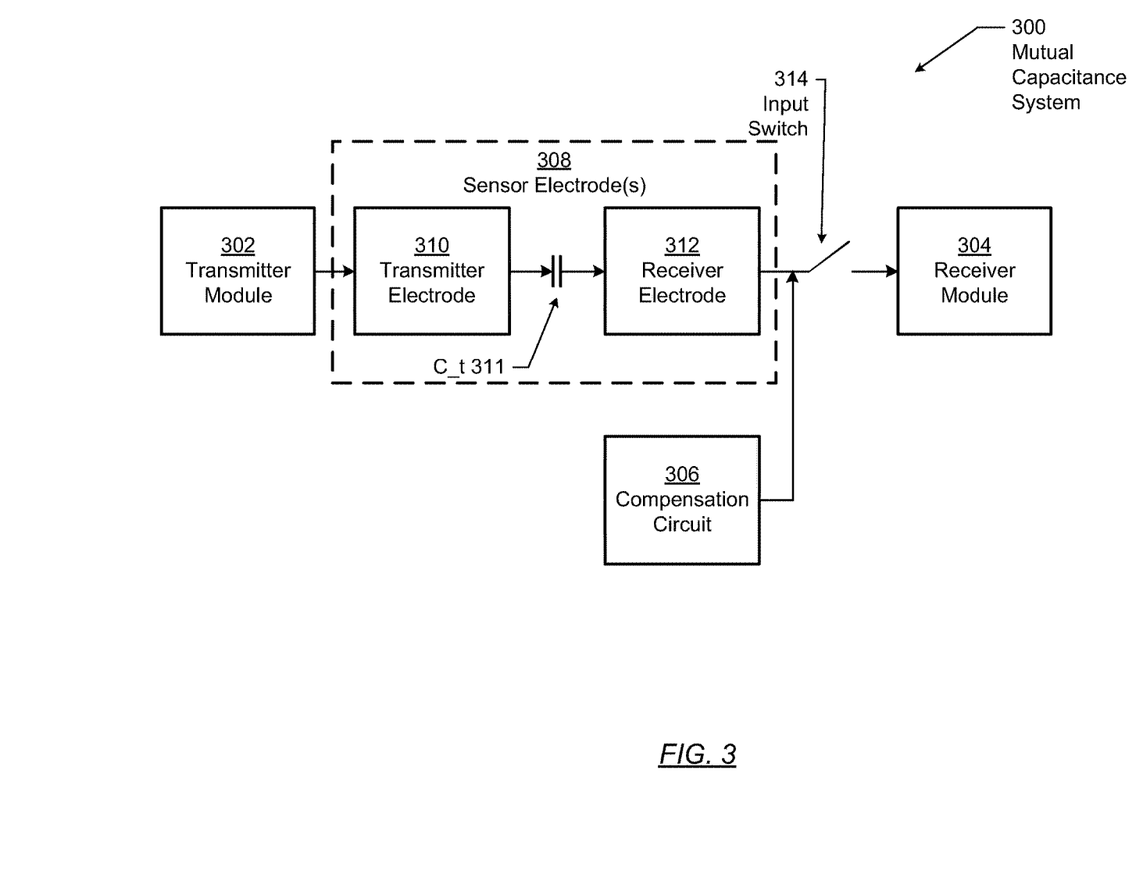

FIG. 3 shows a schematic diagram of a mutual capacitance system (300) in accordance with one or more embodiments of the invention. The transmitter module (302), sensor electrode(s) (308) including transmitter electrode (310) and receiver electrode (312), compensation circuit (306), and receiver module (304) in FIG. 3 may be the same or similar to the transmitter module (202), sensor electrode(s) (208) including transmitter electrode (210) and receiver electrode (212), compensation circuit (206), and receiver module (204), respectively, shown in FIG. 2. Further, a capacitance C_t (311) may exist between the transmitter electrode (310) and the receiver electrode (312).

FIG. 3 shows the receiver electrode (312) connected to the receiver module (304) via an input switch (314). As with each switch used herein, input switch (314) may be in the open state or closed state. In the open state, input switch (314) breaks the connection between the receiver electrode (312) and the receiver module (304), such that charge may not flow to the receiver module (304). In the closed state, the input switch (314) allows charge to flow from the receive electrode (312) to the receiver module (304). In one or more embodiments of the invention, when the compensation circuit (306) drives charge onto the sensor electrode(s) (308), the input switch (314) is in the open state. When the receiver module (304) receives the resulting signal(s), the input switch (314) is in the closed state.

Figure 4:
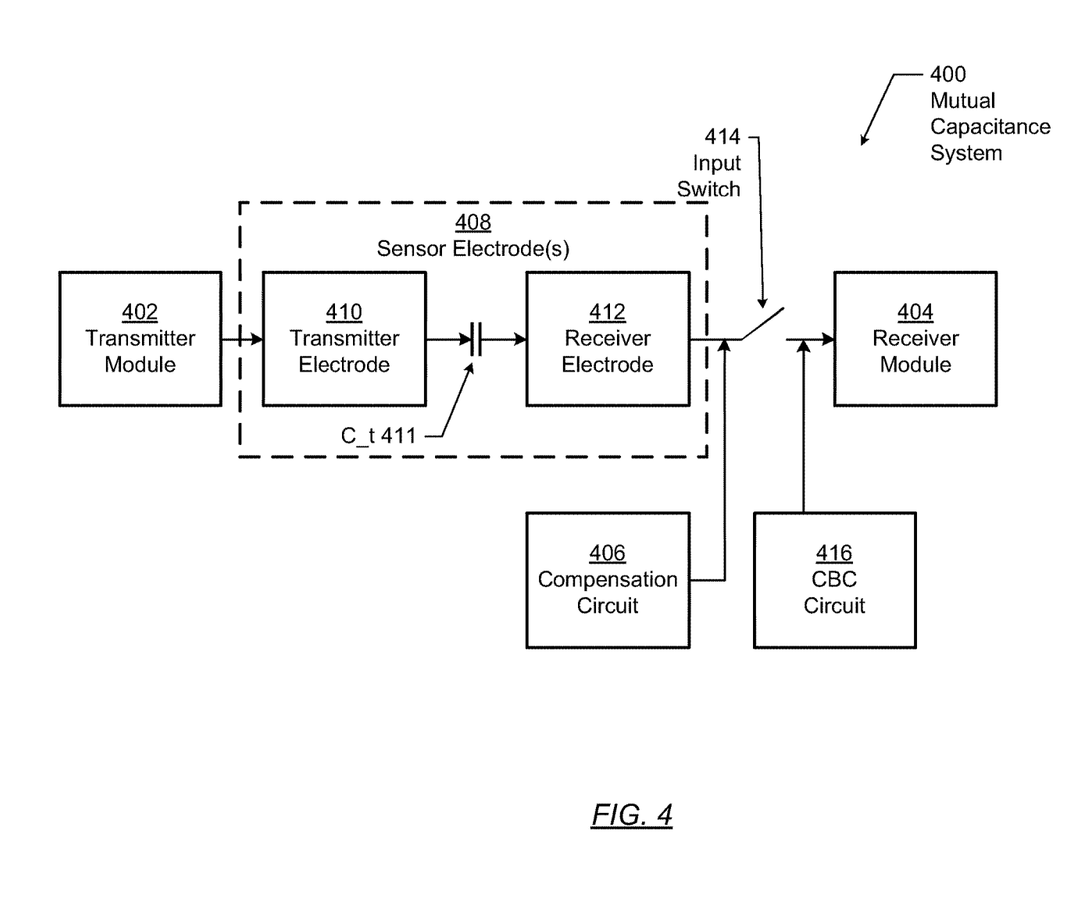

FIG. 4 shows a schematic diagram of a mutual capacitance system (400) in accordance with one or more embodiments of the invention. The transmitter module (402), sensor electrode(s) (408) including transmitter electrode (410) and receiver electrode (412), compensation circuit (406), receiver module (404), and input switch (414) in FIG. 4 may be the same or similar to the transmitter module (302), sensor electrode(s) (308) including transmitter electrode (310) and receiver electrode (312), compensation circuit (306), receiver module (304), and input switch (314), respectively, shown in FIG. 3. Further, a capacitance C_t (411) may exist between the transmitter electrode (410) and the receiver electrode (412).

As shown in FIG. 4, the mutual capacitance system (400) may additionally include a coarse baseline correction (CBC) circuit (416). In such a scenario, the CBC circuit (416) is connected to the receiver module (404) side of the input switch (414) rather than to the receiver electrode (412) side of the input switch (414). A CBC circuit (416) is a circuit that provides a subtractive charge to center the dynamic range of the mutual capacitance system (400). The CBC circuit (416) may be distinct from the compensation circuit (406) in that a separate connection exists from the CBC circuit (416) to the sensor electrode(s) (408) and receiver module (404) separate from the connection from the compensation circuit (406) to the sensor electrode(s) (408) and receiver module (404). In other words, the charge driven by the compensation circuit (406) is driven at a different time from the charge driven by the CBC circuit (416) to increase the dynamic range. Further, the charge driven by the compensation circuit (406) may follow a separate path from the charge driven by the CBC circuit to increase the dynamic range. As shown in FIG. 4, the compensation circuit (406) may be a separate and distinct circuit from the CBC circuit (416). In other words, in some embodiments of the invention, charge does not flow from the CBC circuit (416) to the compensation circuit (406) or the compensation circuit (406) to the CBC circuit (416). In other embodiments, the compensation circuit (406) may be connected to the CBC circuit (416) or may share circuitry. Various configurations of the compensation circuit (406) and the CBC circuit (416) may be used without departing from the scope of the invention.

In one or more embodiments of the invention, the compensation circuit (406) and the CBC circuit (416) each include functionality such that the compensation circuit (406) drives a charge onto the receiver electrode(s) (412) at a different time than the CBC circuit (416) providing the subtractive charge on the charge integrator. In one or more embodiments of the invention, the different time is non-overlapping. The respective configurations may be performed, for example, using timing circuits, switches, and/or other circuit components, such as a high impedance or a switched impedance.

Figure 5:
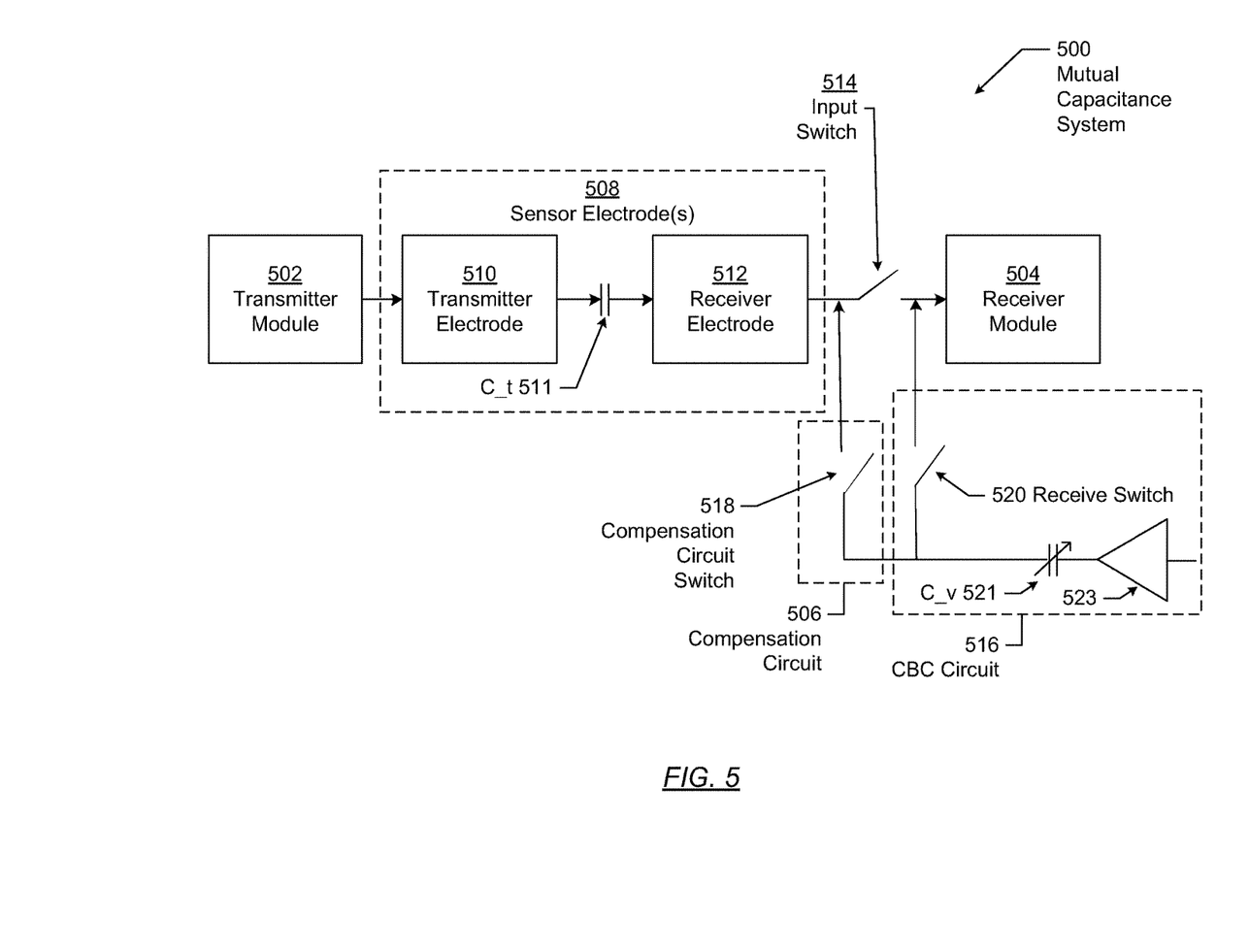

FIG. 5 shows a schematic diagram of a mutual capacitance system (500) in accordance with one or more embodiments of the invention. The transmitter module (502), sensor electrode(s) (508) including transmitter electrode (510) and receiver electrode (512), receiver module (504), and input switch (514) in FIG. 5 may be the same or similar to the transmitter module (402), sensor electrode(s) (408) including transmitter electrode (410) and receiver electrode (412), receiver module (404), and input switch (414), respectively, shown in FIG. 4. Further, a capacitance C_t (511) may exist between the transmitter electrode (510) and the receiver electrode (512).

FIG. 5 shows a configuration of the compensation circuit (506) and the CBC circuit (516) in accordance with one or more embodiments of the invention. Other configurations that are different from the configuration shown in FIG. 5 may exist without departing from the scope of the invention. The compensation circuit (506) and CBC circuit (516) may include the same or similar functionality as the compensation circuit (406) and CBC circuit (416), respectively, discussed above with reference to FIG. 4. The compensation circuit (506) and CBC circuit (516) may include different or additional or less functionality as compared to the compensation circuit (406) and CBC circuit (416), respectively, discussed above with reference to FIG. 4.

In the configuration shown in FIG. 5, the compensation circuit (506) is connected to and receives a charge from the CBC circuit (516) in accordance with one or more embodiments of the invention. The compensation circuit (506) may include a compensation circuit switch (518) and the CBC circuit (516) may include a receive switch (520). As discussed above, the open or closed state of the respective switch may dictate whether charge flows to the sensor electrode(s) (508) or receiver module (504). In one or more embodiments of the invention, the compensation circuit switch (518) and the receive switch (520) are each configured such that both switches are not in a closed state at the same time. Additionally, as shown in FIG. 5, the CBC circuit (516) may optionally include an amplifier (523) and/or an adjustable capacitor (521).

Figure 6:
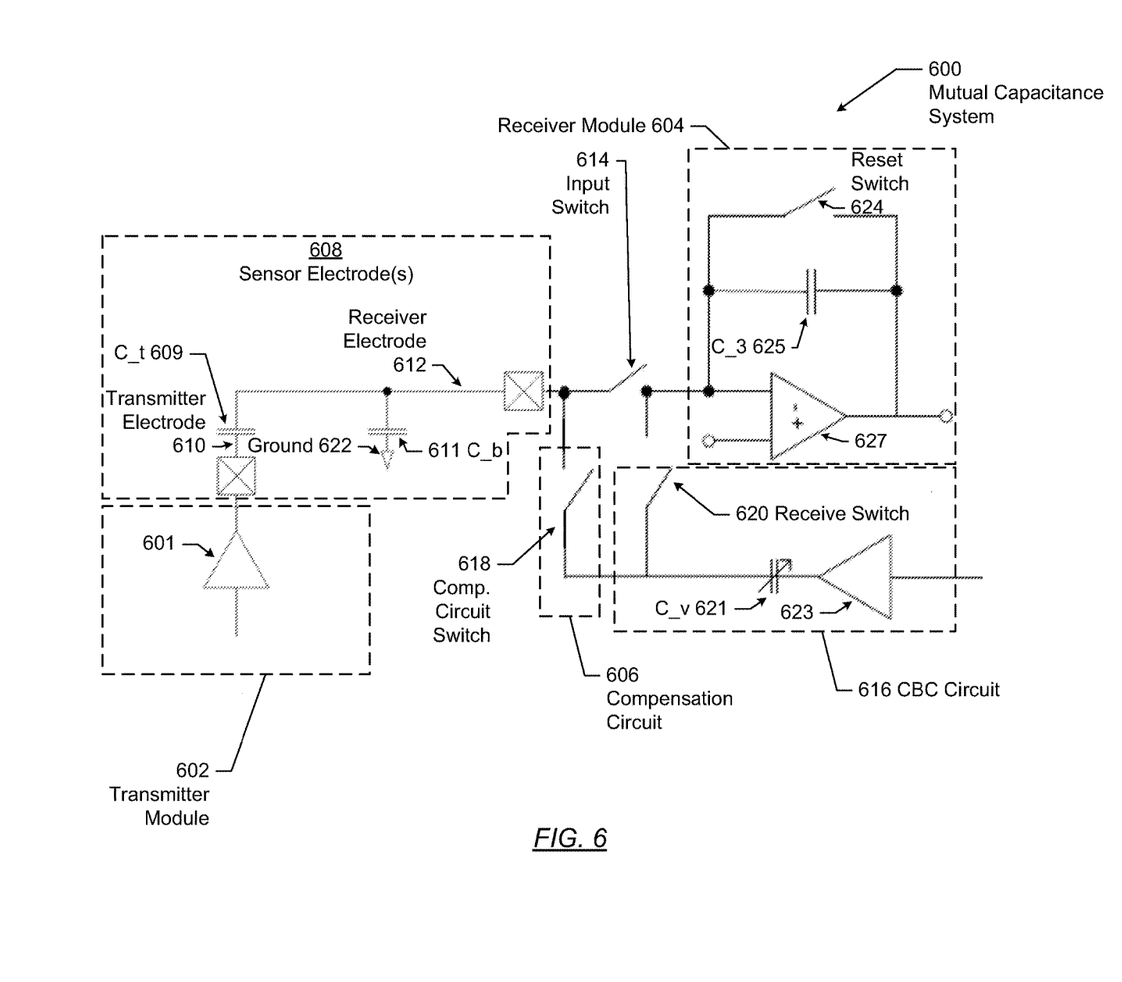

FIG. 6 shows an example schematic circuit diagram of a mutual capacitance system (600) in accordance with one or more embodiments of the invention. As discussed above, various configurations of the mutual capacitance system (600) may exist without departing from the scope of the invention. FIG. 6 shows only one such example configuration.

In FIG. 6, the transmitter module (602), sensor electrode(s) (608) including transmitter electrode (610) and receiver electrode (612), receiver module (604), input switch (614), compensation circuit (606), CBC circuit (616), compensation circuit switch ("Comp. Circuit Switch") (618), and receive switch (620) may include the same or similar functionality as the transmitter module (502), sensor electrode(s) (508) including transmitter electrode (510) and receiver electrode (512), receiver module (504), input switch (514), compensation circuit (506), CBC circuit (516), compensation circuit switch (518), and receive switch (520), respectively, shown in FIG. 5. Additionally or alternatively, the transmitter module (602), sensor electrode(s) (608) including transmitter electrode (610) and receiver electrode (612), receiver module (604), input switch (614), compensation circuit (606), CBC circuit (616), compensation circuit switch ("Comp. Circuit Switch") (618), and receive switch (620) may include different or additional or less functionality as compared to the transmitter module (502), sensor electrode(s) (508) including transmitter electrode (510) and receiver electrode (512), receiver module (504), input switch (514), compensation circuit (506), CBC circuit (516), compensation circuit switch (518), and receive switch (520), respectively, shown in FIG. 5.

In the example schematic circuit diagram of FIG. 6, dashed lines are used to partition the mutual capacitance system into components and solid lines represent a possible path of charge. Further, the transmitter module (602) may include amplifier (601). Capacitances (i.e., C_t (609) and C_b (611)) may exist in the sensor electrodes (608). The CBC Circuit (616) may include an adjustable capacitor (621) and/or an amplifier (623). As illustrated, receiver module (604) comprises reset switch (624). Further, capacitance C_3 (625) and operational amplifier (627) may exist in the receiver module (604). As labeled in FIG. 6, the sensor electrodes (608) may include a common ground (622).

Figure 7:
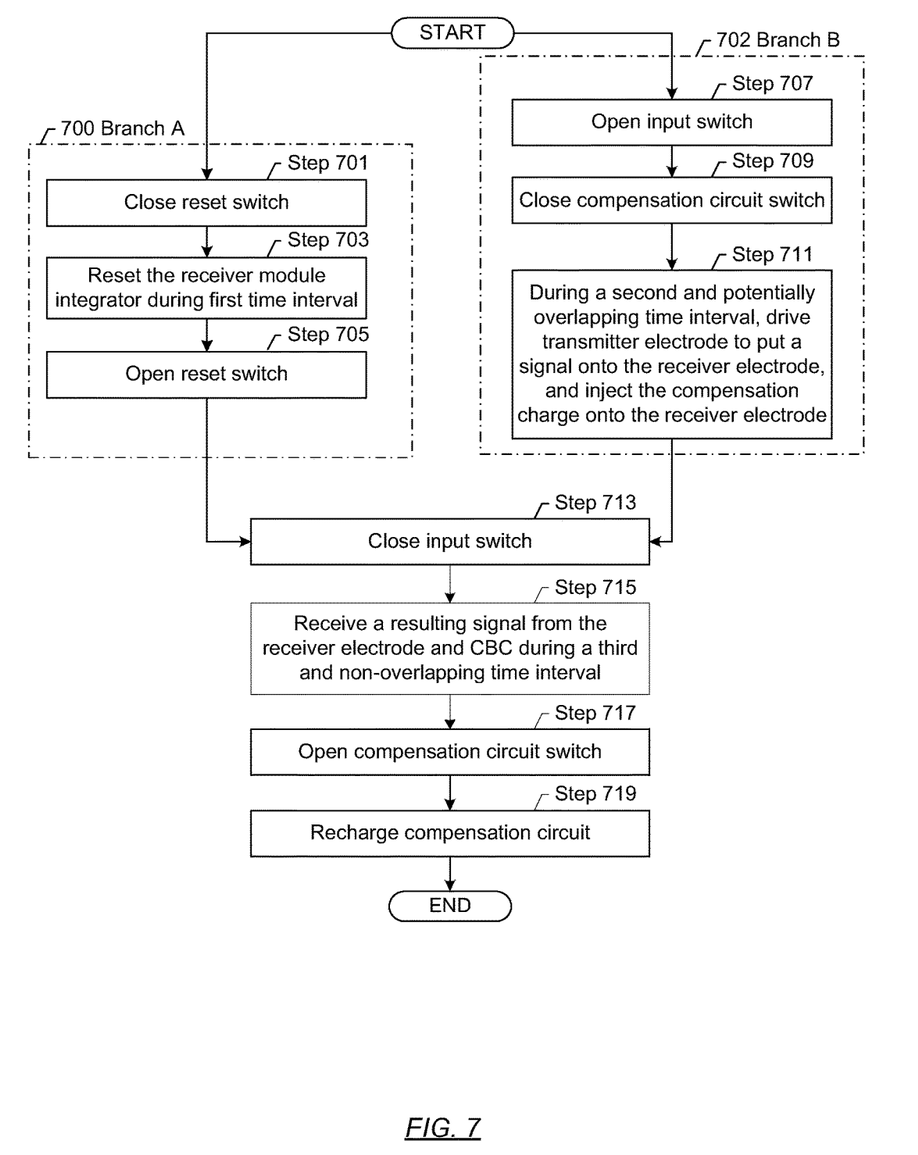
FIG. 7 shows an example flowchart in accordance with one or more embodiments of the invention.

FIG. 7 shows an example flowchart in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. As another example, determination steps may be performed by performing a test, such as checking a data value to test whether the value is consistent with the tested condition in accordance with one or more embodiments of the invention.

Some of the boxes may be optional steps and may not all be performed depending on the configuration of the system. As shown in FIG. 7, the steps may branch into Branch A (700) and Branch B (702), which may, but are not necessarily, performed concurrently. In other words, some of the Steps may be performed in parallel as shown. Further, while the following description includes reference numerals corresponding to FIG. 6, the following description is applicable to any embodiment described above.

Branch A (700) may include the following Steps. In Step 701, the reset switch (624) is closed in accordance with one or more embodiments of the invention. In Step 703, the receiver module (604) is reset during a first time interval. In Step 705, the reset switch (624) is opened in accordance with one or more embodiments of the invention.

Branch B (702) may include the following Steps. In Step 707, the input switch (614) is opened in accordance with one or more embodiments of the invention. In other words, the input switch (614) is set to an open state, thereby, preventing the receiver module (604) from receiving resulting signals.

In Step 709, the compensation circuit switch is closed in accordance with one or more embodiments of the invention. In other words, the compensation circuit switch is set to a closed state. In Step 711, the transmitter (610) is driven to put a signal onto the receiver electrode (612), and the compensation circuit (606) is driven to inject a compensation charge onto the receiver electrode (612). Thus, the compensation circuit may inject a charge onto the receiver electrode, concurrently with the transmitter signal. The injecting of the charge onto the receiver electrode decreases the effect of the RC time constant and, thereby, may reduce the shadowing effect. Step 711 may be performed at a second time interval that potentially overlaps with the first time interval of Step 703.

Continuing with FIG. 7, in Step 713, the input switch (614) is closed in accordance with one or more embodiments of the invention. In other words, the input switch (614) is set to a closed state, thereby, allowing the combined charge on the receiver electrode (612) to flow to the receiver module (604) to receive the resulting signals.

In Step 715, a resulting signal is received from the receiver electrode (612) during a third and non-overlapping time period. Specifically, in one or more embodiments of the invention, the receiver module (604) receives the resulting signal from the receiver electrode (612) at a time period that is non-overlapping with the first or second time periods. Thus, the receiver module (604) may obtain measurements. From the measurements, positional information for any input objects in the sensing region may be determined and reported. In accordance with one or more embodiments of the invention, the positional information that is determined does not show erroneous input objects based on the shadow effect in the sensing region.

In Step 717, the compensation circuit switch is opened in accordance with one or more embodiments of the invention. In other words, the compensation circuit switch is set to an opened state. Thus, the compensation circuit is disconnected from the sensor electrodes so that the compensation circuit may be recharged.

In Step 719, the compensation circuit may be recharged in accordance with one or more embodiments of the invention. The recharging of the compensation circuit allows the switch to be used for a subsequent time period.

Figure 81:
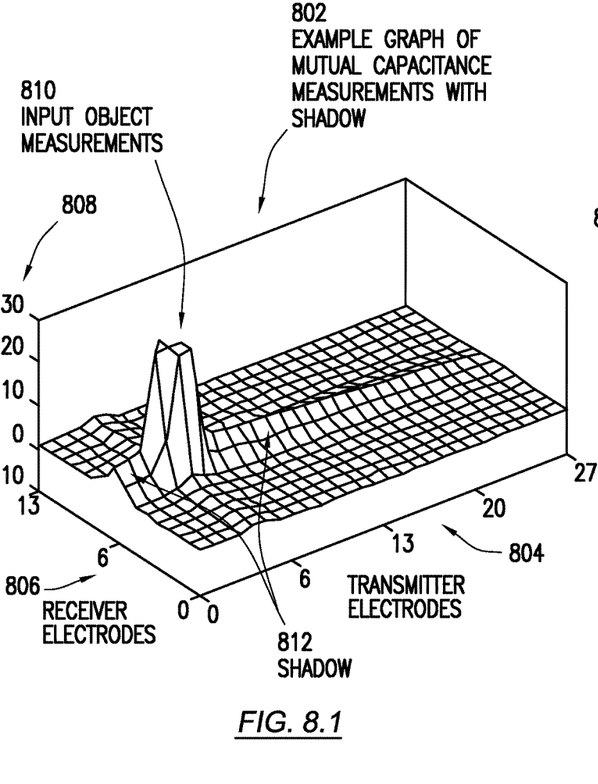
Figure 82:
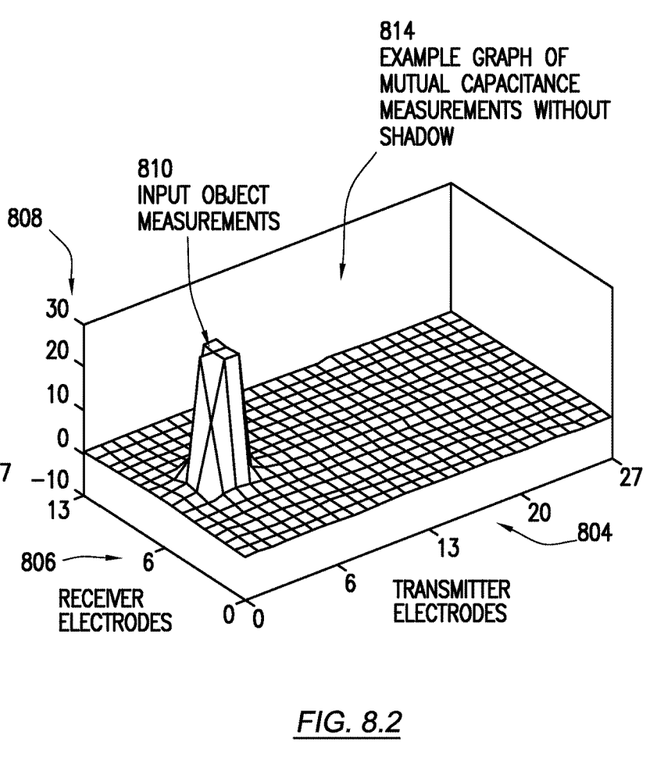

FIGS. 8.1 and 8.2 show example results in accordance with one or more embodiments of the invention. Specifically, FIGS. 8.1 and 8.2 show example graphs of mutual capacitance measurements with and without shadow. In FIGS. 8.1 and 8.2, the mutual capacitance measurements are shown after subtracting the baseline. The graphs are labeled with positions of the transmitter electrodes (804) and positions of receiver electrodes (806) on an example sensing region. The vertical axis (808) represents measurements obtained using the resulting signals. As shown in the example graph of mutual capacitance measurements with a shadow (802) in FIG. 8.1, when an input object is in the sensing region, input object measurements (810) show the presence of the input object in the sensing region. Further, a shadow (812) is present on the same receiver electrode as the receiver electrode having the input object, as shown by the elevated measurements. The shadow (812) is erroneous measurements. Based on the shadow (812), one or more input objects may be erroneously reported as being in the sensing region.

As shown in the example graph of mutual capacitance measurements without shadow (814) in FIG. 8.2, when an input object is in the sensing region, measurements from the input object (810) show the presence of the input object in the sensing region. However, by the driving of a charge on the sensor electrode(s), on the receiver electrode having the input object, a shadow is not present or reduced shown by the lack of elevated measurements. Thus, the measurements may reflect a more accurate presence of input object(s) in the sensing region.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. An input device comprising:
   a plurality of transmitter electrodes;
   a receiver electrode, wherein the receiver electrode is configured to be capacitively coupled to the plurality of transmitter electrodes;
   a processing system coupled to the receiver electrode and the plurality of transmitter electrodes, the processing system configured to:
      transmit a transmitter signal with a first transmitter electrode of the plurality of transmitter electrodes during a first time period,
      open an input switch to prevent an injected charge from flowing from the receiver electrode to the processing system during a second time period, and
      close the input switch after the second time period to obtain a closed input switch, receive, via the closed input switch, a resulting signal with the receiver electrode during a third time period, wherein the resulting signal comprises effects corresponding to the injected charge and the transmitter signal and wherein the second time period and the third time period are non-overlapping; and a compensation circuit coupled to the receiver electrode, the compensation circuit configured to:
close a compensation circuit switch connecting the compensation circuit to the receiver electrode to obtain a closed compensation circuit switch,
inject, via the closed compensation circuit switch, the injected charge onto the receiver electrode during the second time period when the injected charge is prevented from flowing from the receiver electrode to the processing system, and
open, after injecting the injected charge, the compensation circuit switch.

2. The input device of claim 1, wherein the first time period and the second time period at least partially overlap.

3. The input device of claim 1, wherein the first time period and second time period are non-overlapping.

4. The input device of claim 1, wherein the processing system is further configured to determine positional information based on the resulting signal.

5. The input device of claim 1, wherein the receiver electrode is disconnected from the processing system during the second time period.

6. A processing system comprising:
a transmitter module coupled to a transmitter electrode and configured to transmit a transmitter signal with the transmitter electrode during a first time period,
a compensation circuit coupled to a receiver electrode and configured to inject, via a closed compensation circuit switch, an injected charge onto the receiver electrode during a second time period, wherein the closed compensation circuit switch connects the compensation circuit to the receiver electrode; and
a receiver module coupled to the receiver electrode, the receiver electrode configured to be capacitively coupled to the transmitter electrode, the receiver module is configured to receive, via a closed input switch, a resulting signal with the receiver electrode during a third time period, wherein the resulting signal comprises effects corresponding to the injected charge and the transmitter signal, and wherein the second time period and the third time period are non-overlapping,
wherein the injected charge, from the compensation circuit, is prevented from flowing, by an opened input switch, from the receiver electrode to the receiver module during the second time period and when the compensation circuit injects the injected charge onto the receiver electrode,
wherein the opened input switch is closed after the second time period to obtain the closed input switch, and
wherein the closed compensation circuit switch is opened after injecting the injected charge.

7. The processing system of claim 6, wherein the first time period and the second time period at least partially overlap.

8. The processing system of claim 6, wherein the first time period and second time period are non-overlapping.

9. The processing system of claim 6, further comprising a determination module configured to determine positional information based on the resulting signal.

10. The processing system of claim 6, wherein the receiver electrode is disconnected from the receiver module system during the second time period.

11. The processing system of claim 6, further comprising a coarse baseline correction (CBC) circuit configured to center a dynamic range of an input device comprising the processing system, wherein the CBC circuit is connected to the compensation circuit.

12. The processing system of claim 11, wherein the CBC circuit comprises a receive switch, and wherein the receive switch and the closed compensation circuit switch are closed at non-overlapping times.

13. The processing system of claim 6, further comprising a coarse baseline correction (CBC) circuit configured to increase a dynamic range of an input device comprising the processing system, wherein the CBC circuit is separate from the compensation circuit.

14. A method comprising:
closing a compensation circuit switch connecting a compensation circuit to a receiver electrode to obtain a closed compensation circuit switch;
transmitting a transmitter signal on a transmitter electrode during a first time period;
opening an input switch to prevent a flow of an injected charge from the receiver electrode to a receiver module during a second time period;
injecting, via the closed compensation circuit switch and by a compensation circuit, during the second time period while the injected charge is prevented from flowing from the receiver electrode to the receiver module, the injected charge onto the receiver electrode, the receiver electrode capacitively coupled to the transmitter electrode;
closing the input switch after the second time period to obtain a closed input switch;
receiving, by the receiver module and via the closed input switch, a resulting signal from the receiver electrode during a third time period, wherein the resulting signal comprises effects corresponding to the transmitter signal and the injected charge and wherein the second time period and the third time period are non-overlapping;
opening, after injecting the injected charge, the compensation circuit switch; and
determining positional information for an input object based on the resulting signals.

15. The method of claim 14, further comprising:
prior to injecting the injected charge onto the receiver electrode and receiving the resulting signal:
opening a receive switch connecting a coarse baseline correction (CBC) circuit to the receiver electrode.

16. The method of claim 14, wherein the first time period and the second time period are non-overlapping.

17. The method of claim 14, wherein the first time period and the second time period at least partially overlap.

* * * * *